United States Patent
Jeon et al.

(10) Patent No.: US 11,476,466 B2
(45) Date of Patent: *Oct. 18, 2022

(54) METHOD OF PREPARING IRREVERSIBLE ADDITIVE INCLUDED IN CATHODE MATERIAL FOR LITHIUM SECONDARY BATTERY, CATHODE MATERIAL INCLUDING IRREVERSIBLE ADDITIVE PREPARED BY THE SAME, AND LITHIUM SECONDARY BATTERY INCLUDING CATHODE MATERIAL

(71) Applicant: LG Chem, Ltd., Seoul (KR)

(72) Inventors: Hyelim Jeon, Daejeon (KR); Seul Ki Kim, Daejeon (KR); Sang Wook Lee, Daejeon (KR); Wang Mo Jung, Daejeon (KR); Minsuk Kang, Daejeon (KR); Sora Baek, Daejeon (KR); Eunsol Lho, Daejeon (KR)

(73) Assignee: LG Energy Solution, Ltd.

( * ) Notice: Subject to any disclaimer, the term of this patent is extended or adjusted under 35 U.S.C. 154(b) by 281 days.

This patent is subject to a terminal disclaimer.

(21) Appl. No.: 16/613,728

(22) PCT Filed: Nov. 16, 2018

(86) PCT No.: PCT/KR2018/014125
§ 371 (c)(1),
(2) Date: Nov. 14, 2019

(87) PCT Pub. No.: WO2019/098764
PCT Pub. Date: May 23, 2019

(65) Prior Publication Data
US 2020/0075957 A1    Mar. 5, 2020

(30) Foreign Application Priority Data

Nov. 17, 2017  (KR) .......................... 10-2017-0154184
Nov. 16, 2018  (KR) .......................... 10-2018-0141758

(51) Int. Cl.
*H01M 4/62*      (2006.01)
*C01G 53/00*    (2006.01)
(Continued)

(52) U.S. Cl.
CPC .............. *H01M 4/62* (2013.01); *C01G 53/42* (2013.01); *H01M 4/483* (2013.01); *H01M 10/0525* (2013.01); *C01P 2006/40* (2013.01)

(58) Field of Classification Search
None
See application file for complete search history.

(56) References Cited

U.S. PATENT DOCUMENTS 5,759,719 A    6/1998  Mao
5,955,219 A    9/1999  Nishijima et al.
(Continued)

FOREIGN PATENT DOCUMENTS

CN      1206501 A      1/1999
CN    102339980 A      2/2012
(Continued)

OTHER PUBLICATIONS

Elly, et al., "Structural changes and electrochemical properties of Li2Cu1—xMx02 for lithium secondary batteries," Solid State Ionics, Dec. 4, 2013, pp. 115-119, vol. 262, XP028855896.
(Continued)

*Primary Examiner* — Lucas J. O'Donnell
(74) *Attorney, Agent, or Firm* — Lerner, David, Littenberg, Krumholz & Mentlik, LLP (57) ABSTRACT

There are provided a method of preparing an irreversible additive in which a content of a Li-based by-product such as unreacted lithium oxide generated in a process of preparing lithium nickel-based oxide is decreased, which may significantly reduce gelation of a composition including the irreversible additive, a cathode material including the irrevers-
(Continued)

ible additive prepared by the same, and a lithium secondary battery including the cathode material.

11 Claims, 1 Drawing Sheet

(51) Int. Cl.
*H01M 4/48* (2010.01)
*H01M 10/0525* (2010.01)

(56) References Cited

U.S. PATENT DOCUMENTS

| | | |
|---|---|---|
| 6,007,947 A | 12/1999 | Mayer |
| 2007/0015055 A1 | 1/2007 | Lee et al. |
| 2010/0279172 A1 | 11/2010 | Hwang et al. |
| 2011/0175021 A1 | 7/2011 | Paulsen et al. |
| 2012/0021284 A1 | 1/2012 | Lee et al. |
| 2012/0164533 A1 | 6/2012 | Senoue et al. |
| 2013/0011727 A1 | 1/2013 | Chang et al. |
| 2013/0101899 A1 | 4/2013 | Kajita et al. |
| 2015/0340692 A1 | 11/2015 | Park et al. |
| 2017/0069907 A1 | 3/2017 | Zhu et al. |
| 2017/0133684 A1 | 5/2017 | Han et al. |
| 2018/0294481 A1 | 10/2018 | Wohlfahrt-Mehrens et al. |
| 2020/0335790 A1* | 10/2020 | Han .................. H01M 4/1391 |
| 2021/0083290 A1* | 3/2021 | Kim .................... H01M 4/131 |

FOREIGN PATENT DOCUMENTS

| | | | |
|---|---|---|---|
| CN | 105098188 A | 11/2015 | |
| CN | 106159216 A | 11/2016 | |
| CN | 106898737 A | 6/2017 | |
| EP | 0794155 A1 | 9/1997 | |
| JP | H09241027 A | 9/1997 | |
| JP | H10208730 A | 8/1998 | |
| JP | 2004284845 A | 10/2004 | |
| JP | 3705728 B2 | 10/2005 | |
| JP | 2006514776 A | 5/2006 | |
| JP | 2010262914 A | 11/2010 | |
| JP | 2012142156 A | 7/2012 | |
| KR | 20030076153 A | 9/2003 | |
| KR | 20040088292 A | 10/2004 | |
| KR | 20050030588 A | 3/2005 | |
| KR | 20060008568 A | 1/2006 | |
| KR | 20150079362 A | 7/2015 | |
| KR | 20160131069 A | 11/2016 | |
| WO | 2005031892 A2 | 4/2005 | |
| WO | 2011162090 A1 | 12/2011 | |
| WO | 2015034257 A1 | 3/2015 | |
| WO | 2015072093 A1 | 5/2015 | |
| WO | 2017045817 A1 | 3/2017 | |

OTHER PUBLICATIONS

Extended Eurpoean Search Report with Written Opinion for Application No. 18879058.8 dated Jun. 8, 2020, 11 pages.
Kim, et al., "Air stable A1203-coated Li2Ni02 cathode additive as a surplus current consumer in a Li-ion cell," Journal of Materials Chemistry, Jan. 1, 2008, p. 5880, vol. 18, No. 48, XP055077327.
Lee, et al., "Li2Ni02 as a Novel Cathode Additive for Overdischarge Protection of Li-Ion Batteries," Chemistry of Materials, Jan. 1, 2008, pp. 5-7, vol. 20, No. 1, XP055104544.
Ruther, et al., "Synthesis, Structure, and Electrochemical Performance of High Capacity Li2Cu0.5Ni0.502 Cathodes", Chemistry of Materials, Sep. 16, 2015, pp. 6746-6754, vol. 27, No. 19, XP055679520.
Xu, et al., "Investigating Li2NiO2—Li2CuO2 Solid Solutions as A High-Capacity Cathode Materials for Li-Ion Batteries", Journal of Physical Chemistry C, May 23, 2017, pp. 11100-11107, vol. 121, No. 21, XP055698895.
International Search Report from Application No. PCT/KR2018/014125 dated Apr. 11, 2019, 3 pages.
Chinese Search Report for Application No. 201880018354.5, dated Jun. 29, 2021, 4 pages.
Nobuyuyki Imanishi, et al., "Preparation and electrochemical properties of a Li2CuO2—Li2NiO2 solid solution as a lithium-intercalation electrode", Solid State Ionics, Jun. 2006, pp. 1341-1346, vol. 177, issues 15-16, Elsevier.
Rose Ruther, et al., "Structural transformations in high-capacity Li2Cu0. 5Ni0. 5O2 cathodes", Chemistry of Materials, published online Mar. 2017, pp. 2997-3005, vol. 29, No. 7, American Chemical Society Publications.

* cited by examiner

METHOD OF PREPARING IRREVERSIBLE ADDITIVE INCLUDED IN CATHODE MATERIAL FOR LITHIUM SECONDARY BATTERY, CATHODE MATERIAL INCLUDING IRREVERSIBLE ADDITIVE PREPARED BY THE SAME, AND LITHIUM SECONDARY BATTERY INCLUDING CATHODE MATERIAL

CROSS-REFERENCE TO RELATED APPLICATION

The present application is a national phase entry under 35 U.S.C. § 371 of International Application No. PCT/KR2018/014125 filed Nov. 16, 2018, the disclosure of which is incorporated herein in its entirety by reference, which claims priority to and the benefit of Korean Patent Application No. 10-2017-0154184 filed in the Korean Intellectual Property Office on Nov. 17, 2017, and Korean Patent Application No. 10-2018-0141758 filed in the Korean Intellectual Property Office on Nov. 16, 2018, the entire contents of which are hereby incorporated herein by reference.

TECHNICAL FIELD

The present invention relates to a method of preparing an irreversible additive in which a fraction of a material providing irreversible capacity is increased and a content of a lithium by-product is minimized, which may significantly reduce gelation of a cathode material composition including the irreversible additive, a cathode material including the irreversible additive prepared by the same, and a lithium secondary battery including the cathode material.

BACKGROUND ART

In accordance with technological developments and increase demands for mobile devices, the demand for a secondary battery has increased rapidly as an energy resource. Among these secondary batteries, a lithium secondary battery having a high energy density and voltage, a long lifespan, and a low self-discharge rate is commercially available and widely used.

The lithium secondary battery generally uses a carbon-based material as an anode material. However, an anode formed of the carbon-based material has a theoretical maximum capacity of 372 mAh/g (844 mAh/cc), thus increase of capacity thereof is limited. In addition, a lithium metal, studied for use as the anode material, has a high energy density and thus may realize high capacity, but has problems associated with safety concerns due to growth of dendrites and a short charge and discharge cycle lifespan as the battery is repeatedly charged and discharged.

Accordingly, an anode active material having a high energy density is inevitably used as a material exhibiting high capacity and capable of substituting the lithium metal, and a number of studies and suggestions on silicon, tin, or an alloy thereof has been proposed. For example, a silicon-based material reversibly occludes and releases lithium through a reaction therewith, and has a maximum theoretical capacity of about 4,200 mAh/g (9,366 mAh/cc, specific gravity: 2.23) which is very high compared to a carbon-based material. Therefore the silicon-based material is promising as a high capacity anode material.

However, these anode materials have a low initial efficiency, resulting in a large amount of initial irreversible capacity loss during the initial charge and discharge.

With respect to the above-mentioned problems, a method of decreasing an irreversible capacity loss of an anode by using a material which provides a lithium ion supply source or a lithium ions reservoir to a cathode material and which exhibits electrochemical activity after the initial cycle operation so as to prevent deterioration of the performance of the whole battery has been studied and proposed. In detail, there is a method in which lithium nickel-based oxide in which an excess amount of lithium such as $Li_2NiO_2$ is included is used for a cathode, as a sacrificial cathode material or an irreversible additive (or an overdischarge-preventing agent).

However, the lithium nickel-based oxide described above is mainly prepared by reacting nickel oxide, nickel carbonate, or the like with an excess amount of lithium, in this case, unreacted lithium oxide ($Li_2O$) or a by-product such as LiOH and $Li_2CO_3$ remain in the finally prepared lithium nickel-based oxide. The lithium oxide and the by-product remaining in the lithium nickel-based oxide are decomposed at the time of the initial cycle operation of the battery and generate excessive gas such as $O_2$, $CO_2$, and the like. The by-product such as LiOH causes viscosity increase or gelation of the composition by reacting with a binder component at the time of preparing a composition for preparing electrodes. Thus, when the electrode composition for forming an active material layer is coated, uniform coating is difficult, as a result, the battery characteristics are deteriorated. Further, glass lithium (Li) derived from glass LiOH and/or LiOH also causes deterioration of cycle efficiency of a cathode.

Related Art Document (Patent Document 1) Korean Patent Laid-Open Publication No. 2003-0076153 (published on Sep. 26, 2003)

DISCLOSURE

Technical Problem

The present invention has been made in an effort to provide a method of preparing an irreversible additive in which a fraction of lithium nickel-based oxide is increased and a content of a Li-based by-product such as unreacted lithium oxide and the like is reduced, which may reduce the risk of an increase in viscosity or gelation of a composition during preparation of an electrode.

The present invention has been made in an effort to also provide a cathode material for a lithium secondary battery including the irreversible additive prepared by methods disclosed herein and utilizing the additive to decrease the content of Li-based by-products, such as unreacted materials, and which can be incorporated into a lithium secondary battery including the cathode material which exhibits excellent electrochemical characteristics.

Technical Solution

Terms and words used in the present specification and claims are not to be construed as a general or dictionary meaning but are to be construed as meaning and concepts meeting the technical ideas of the present invention based on a principle that the inventors can appropriately define the concepts of terms in order to describe their own inventions in best mode.

Hereinafter, a method of preparing an irreversible additive included in a cathode material for a lithium secondary battery according to an embodiment, a cathode material including the irreversible additive prepared by the preparing method, and a lithium secondary battery including the cathode material will be described.

An exemplary embodiment of the present invention provides a method of preparing an irreversible additive included in a cathode material for a lithium secondary battery, the method including: mixing an excess lithium precursor, the precursor including $Li_{2+a}Ni_{1-b}M_bO_{2+c}$, NiO, and $Li_2O$ physically bonded to each other at a mole ratio of x:y:z, with additional NiO, and heat-treating the mixture to prepare a lithium-excess transition metal oxide in which $Li_{2+a}Ni_{1-b}M_bO_{2+c}$, NiO, and $Li_2O$ are physically bonded to each other at a mole ratio of x':y':z'.

Here, $-0.2 \leq a \leq 0.2$, $0 \leq b < 1$, and $0 \leq c \leq 0.2$, x is 0.8 or more, x' is 0.93 or more, x<x', y>y', and z>z', based on x+y=1 and x'+y'=1, z is more than 0 and 0.21 or less based on x+y=1, and z' is 0 to 0.09 based on x'+y'=1, and M is at least one element selected from the group consisting of Cu, Mg, Pt, Al, Co, P, and B.

As such, in the preparing method according to the embodiment, the excess lithium precursor, which is prepared by a conventional method and is an irreversible additive in which $Li_{2+a}Ni_{1-b}M_bO_{2+c}$ is included at a low mole ratio, is mixed with an additional NiO and heated such that at least a portion of the remaining unreacted $Li_2O$ is additionally reacted, such that a fraction of $Li_{2+a}Ni_{1-b}M_bO_{2+c}$ in the irreversible additive may be increased, and relatively, an amount of the Li-based by-product such as unreacted lithium oxide and the like may be decreased. Therefore, it is more advantageous in terms of provision of Li to an anode, which effectively compensates for a low efficiency of the anode and significantly reduces gelation of the electrode composition generated by the presence of a lithium compound.

A mole ratio of the excess lithium precursor to materials constituting the lithium-excess transition metal oxide is a concept proportional to the fraction, values of x, y, and z, and x', y', and z' are determined based on x+y=1 and x'+y'=1 in the present invention.

In detail, x is 0.8 or more, x' is 0.93 or more, z is more than 0 and 0.21 or less, and z' is 0 to 0.09, based on x+y=1 and x'+y'=1 and x<x', y>y', z>z'. More specifically, x may be 0.8 to 0.9, x' may be 0.93 to 1.0, and z' may be 0 to 0.055.

That is, in the case of the excess lithium precursor prepared by the conventional method, a mole ratio of $Li_{2+a}Ni_{1-b}M_bO_{2+c}$ which substantially provides the irreversible capacity is as low as 80% to 90% based on a total of $Li_{2+a}Ni_{1-b}M_bO_{2+c}$ and NiO, meanwhile, a mole ratio of $Li_2O$ is relatively high based on the total of $Li_{2+a}Ni_{1-b}M_bO_{2+c}$ and NiO.

However, as in the present invention, in the case where the excess lithium precursor is mixed with the additional NiO capable of reacting with at least a portion of the remaining $Li_2O$ and heat-treated, NiO originally present in the excess lithium precursor and the additional NiO are further reacted with the remaining $Li_2O$. Therefore, a mole ratio of $Li_{2+a}Ni_{1-b}M_bO_{2+c}$ is increased up to 93% or more, that is, x' is 0.93 or more, based on the total of $Li_{2+a}Ni_{1-b}M_bO_{2+c}$ and NiO, and a mole ratio of $Li_2O$ is relatively decreased, such that x<x', y>y' and z>z', z' may be 0 to 0.09, and more specifically, z' may be 0 to 0.055.

Meanwhile, in the preparing method, in consideration of the mole ratios of NiO and $Li_2O$ which are present in the excess lithium precursor, an amount of NiO to be additionally mixed is not limited so long as a mole ratio of $Li_{2+a}Ni_{1-b}M_bO_{2+c}$ is 0.93 or more, that is, 93% or more based on the total of $Li_{2+a}Ni_{1-b}M_bO_{2+c}$ and NiO by the reaction caused by the additional heat treatment. NiO may be added in a content in a range from a mole ratio of NiO smaller than that of unreacted $Li_2O$ to a mole ratio of NiO larger than that of unreacted $Li_2O$ to some degree with respect to 1 mole of the excess lithium precursor.

However, in a case where NiO is excessively added, since a large amount of NiO which is not reacted with $Li_2O$ rather remains, the mole ratio of $Li_{2+a}Ni_{1-b}M_bO_{2+c}$ is decreased and the mole ratio of NiO is increased overall, therefore, an amount of material which can provide Li is substantially reduced compared to the same weight of the additional NiO described above, which is not preferable.

Accordingly, NiO may be added in a content in a range from a mole ratio of NiO smaller than that of unreacted $Li_2O$ to a mole ratio of NiO larger than that of unreacted $Li_2O$ to some degree with respect to 1 mole of the excess lithium precursor so that a mole ratio of $Li_{2+a}Ni_{1-b}M_bO_{2+c}$ is increased after completion of reaction. Specifically, NiO may be mixed at a mole ratio of 0.1z to z with respect to 1 mole of the excess lithium precursor. More specifically, NiO may be mixed at a mole ratio of 0.5z to z with respect to 1 mole of the excess lithium precursor. As described above, in consideration of the mole ratios of NiO and $Li_2O$ which are present in the excess lithium precursor, a specific amount of NiO to be added may be mixed at an amount in which a mole ratio of $Li_{2+a}Ni_{1-b}M_bO_{2+c}$ is 0.93 or more, that is, 93% or more based on the total of $Li_{2+a}Ni_{1-b}M_bO_{2+c}$ and NiO by the reaction caused by the additional heat treatment.

In detail, the heat treatment described above is performed in an inert atmosphere at 500 to 800° C. for 12 hours to 24 hours.

The heat treatment may be performed in an inert atmosphere to suppress production of side reactions, specifically, may be performed in an inert gas atmosphere such as $N_2$, He, Ar, or the like, and may be performed in a $N_2$ atmosphere or an Ar atmosphere in consideration of excellent reaction efficiency increase and inhibitory effect on production of side reactions among these atmospheres.

In addition, when the heat treatment is performed within the temperature range described above, reaction of unreacted material present in the conventional excess lithium precursor with the additional NiO is facilitated, and the additional heat treatment does not cause side reactions or decomposition of the reaction material. In this case, a mole ratio of $Li_{2+a}Ni_{1-b}M_bO_{2+c}$ may be increased and a mole ratio of $Li_2O$ may be decreased with excellent efficiency without reduction of discharge capacity per unit weight, cycle characteristics, and an operating voltage which may occur. In more detail, considering superiority of heating temperature control effect, the heat treatment may be performed at 600° C. to 700° C., and more specifically, performed at 650° C. to 700° C.

Further, the heat treatment may be performed for 12 hours to 24 hours. In a case where the heat treatment is performed for less than 12 hours, the unreacted lithium oxide is insufficiently reacted with NiO due to a short reaction time and the effect of reducing the lithium-based by-product in the cathode material may be small due to degradation of reaction efficiency. On the other hand, in a case where the heat treatment is performed for more than 24 hours, it may be inefficient in a process, for example, an overreaction may occur, a sintering time may become too long, and the like. More specifically, the heat treatment may be performed for 15 hours to 20 hours.

The irreversible additive prepared by the method as described above includes the lithium-excess transition metal oxide in which $Li_{2+a}Ni_{1-b}M_bO_{2+c}$, NiO, and $Li_2O$ are physically bonded to each other at a mole ratio of x':y':z', where −0.2≤a≤0.2, 0≤b<1, and 0≤c≤0.2, x' is 0.93 or more and z' is 0 to 0.09 based on x'+y'=1, and M may be at least one element selected from the group consisting of Cu, Mg, Pt, Al, Co, P, and B.

Meanwhile, the excess lithium precursor for preparing the irreversible additive according to the present invention is prepared by mixing, for example, a lithium raw material, a nickel raw material, and a raw material of an element M and heat-treating the mixture.

The heat treatment for preparing the excess lithium precursor is performed in an inert atmosphere at 650 to 700° C. for 12 hours to 24 hours.

At the time of the heat treatment, when the excess lithium precursor is prepared within the temperature and time range described above, the lithium raw material and the raw material of the element M may be reacted sufficiently with each other, and an unreacted material may be minimized.

Examples of the lithium raw material may be a lithium-containing oxide, sulfate, nitrate, acetate, carbonate, oxalate, citrate, halide, hydroxide, oxyhydroxide, or the like, and particularly may be $Li_2CO_3$, $LiNO_3$, $LiNO_2$, $LiOH$, $LiOH.H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$. The lithium raw material may be a mixture of one or more thereof. Among the lithium raw materials, in consideration of reaction efficiency and reduction effect on production of side reactions at the time of reaction with the nickel raw material, the lithium raw material may be $Li_2O$.

The nickel raw material may be a nickel-containing oxide such as nickel oxide (NiO) or hydroxide such as nickel hydroxide ($Ni(OH)_2$).

The raw material of the element M may be an element M-containing oxide, sulfate, nitrate, acetate, carbonate, oxalate, citrate, halide, hydroxide, oxyhydroxide, or the like. In this case, a portion of nickel substituted by M in the finally prepared the lithium nickel-containing oxide, such that M serves to improve heat stability and structural stability. Specifically, M may be selected from a transition metal element having an oxidation number of +2, +3, or +5, such as Cu, Mn, W, Fe, Mg, Pt, Ti, Co, or Zr; an amphoteric element having an oxidation number of +3 such as Al; and the group consisting of P, F, and B. Among these elements, M may be selected from the group consisting of Cu, Mg, Pt, Al, Co, P, and B. As described above, the lithium raw material, the nickel raw material, and the raw material of the element M may be used in a content which satisfy a composition ratio of a metal element such as lithium and nickel in lithium nickel composite oxide of Formula (1) which is finally prepared.

In addition, when the raw materials described above are mixed, a sintering agent may be further selectively added. The sintering agent may be, specifically, a ammonium ion-containing compound such as $NH_4F$, $NH_4NO_3$, or $(NH_4)_2SO_4$; a metal oxide such as $B_2O_3$ or $Bi_2O_3$; or a metal halide such as $NiCl_2$ or $CaCl_2$, and may be a mixture of one or more thereof. The sintering agent may be used in an amount of 0.01 mole to 0.2 mole with respect to 1 mole of the nickel raw material. When the sintering agent is used within the above range, an effect of improvement in sintering characteristics is significant. Therefore, performance of the cathode material may be improved and initial capacity of the battery during charging and discharging of the battery may be prevented.

Furthermore, when the raw materials described above are mixed, a water-removing agent may be further selectively added. Specifically, the water-removing agent may include citric acid, tartaric acid, glycolic acid, maleic acid, or the like, and may be a mixture of one or more thereof. The water-removing agent may be used in an amount of 0.01 mole to 0.2 mole with respect to 1 mole of the nickel raw material.

The excess lithium precursor may be prepared by the preparing method as described above, in this case, the excess lithium precursor is present by being included in the reaction product in which the unreacted lithium oxide such as $Li_2O$ and the nickel oxide together with the compound having Composition Formula of $Li_{2+a}Ni_{1-b}M_bO_{2+c}$.

Therefore, according to present invention, an additional NiO mixing heat treatment process as described above is performed so as to increase an amount of $Li_{2+a}Ni_{1-b}M_bO_{2+c}$ compensating for irreversible efficiency by reducing an amount of unreacted lithium oxide and substantially providing lithium.

The thus prepared irreversible additive may include 3 wt % or less of the lithium by-product, particularly may include 2 wt % or less of the lithium by-product, still more particularly may include 2 wt % or less of LiOH, still more particularly may include 1.5 wt % or less of LiOH, and may include 0 to 0.5 wt % of $Li_2CO_3$ and specifically may include 0 to 0.3 wt % of $Li_2CO_3$ based on a total weight of the irreversible additive, when the lithium by-product such as the unreacted lithium oxide and the like are measured by pH titration. When the unreacted lithium oxide is stirred in distilled water to be measured by pH titration, the unreacted lithium oxide is decomposed into LiOH and $Li_2CO_3$, it can be confirmed that a content of the unreacted lithium oxide is large or small from the contents of the LiOH and $Li_2CO_3$.

As such, there is a reduced concern or no concern about gelation at the time of a mixing process for preparing a cathode including the irreversible additive due to the significantly reduced lithium by-product. Accordingly, the cathode material of the present disclosure may exhibit an excellent effect on the gelation reduction compared to use the conventional irreversible additive.

Meanwhile, the present invention provides also a cathode material including the irreversible additive according to the present invention and a cathode active material.

In this case, a content of the irreversible additive may be 0.1 wt % to 10 wt %, particularly may be 1 wt % to 5 wt %, and more particularly may be 1 wt % to 3 wt % based on a total weight of the cathode material.

When the content of the irreversible additive is out of the range described above and less than 0.1 wt %, effect of anode efficiency compensation according to the addition of the irreversible additive may not be obtained. When the content of the irreversible additive exceeds 10 wt %, as use of a Si-based anode is increased, problems such as the volume expansion, lifespan degradation, and the like of the battery caused in the anode may be generated.

In the cathode material including the irreversible additive according to the present invention, the content of unreacted lithium oxide may be significantly decreased overall and the content of $Li_{2+a}Ni_{1-b}M_bO_{2+c}$ may be increased compared to the conventional irreversible additive. Gelation of the composition may be significantly reduced when the cathode material is prepared or the cathode material is coated on the current collector for preparing the cathode, and cycle characteristics may be improved, due to the decreased content of $Li_2O$.

Another embodiment of the present invention provides a lithium secondary battery having a structure in which an electrode assembly is embedded in a battery case together with an electrolyte, wherein the electrode assembly includes: a cathode having a cathode current collector on which the cathode material is coated; an anode having an anode current collector on which an anode material including an anode active material is coated; and a separator interposed between the cathode and the anode.

In addition, the cathode material may further include a conductive material and a binder in addition to the irreversible additive and the cathode active material described above.

In detail, the cathode active material may be, for example, $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-d}Co_dO_2$, $LiCo_{1-d}Mn_dO_2$, $LiNi_{1-d}Mn_dO_2$(0≤d<1), $Li(Ni_aCo_bMn_c)O_4$ (0<a<2, 0<b<2, 0<c<2, a+b+c=2), $LiMn_{2-e}Ni_eO_4$, $LiMn_{2-e}Co_eO_4$ (0<e<2), $LiCoPO_4$, or $LiFePO_4$, and may be may be a mixture of one or more thereof.

The conductive material may be used for providing conductivity to the electrode. The conductive material may be not particularly limited as long as it has electron conductivity without causing chemical changes in a battery. Specific examples of the conductive material may include carbon-based materials such as carbon black, acetylene black, Ketjen black, channel black, furnace black, lamp black, thermal black or carbon fiber; graphite such as natural graphite or artificial graphite; metal powder or metal fiber such as copper, nickel, aluminum or silver; conductive whiskers such as a zinc oxide whisker, or a potassium titanate whisker; conductive metal oxides such as titanium oxide; or conductive polymers such as polyphenylene derivatives, and the like, and one or a mixture of two or more thereof may be used. The conductive material may be included at 1 wt % to 30 wt % based on a total weight of the cathode material.

The binder serves to bond cathode active material particles to each other and enhance adhesiveness between the cathode active material and the current collector. Specific examples of the binder may include polyvinylidene fluoride (PVDF), polyvinylidene fluoride-co-hexafluoropropylene (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene methylene polymer (EPDM), sulfonated-EPDM, styrene-butadiene rubber (SBR), fluoro rubber, various copolymers, and the like, and one or a mixture of two or more thereof may be used. The binder may be included at 1 wt % to 30 wt % based on a total weight of the cathode material.

The cathode collector may not be particularly limited as long as it has conductivity without causing chemical changes in a battery. Examples of the cathode collector may include stainless steel, aluminum, nickel, titanium, sintered carbon, or aluminum or stainless steel of which a surface is treated with carbon, nickel, titanium, silver, or the like. In addition, the cathode collector may have a thickness of 3 μm to 500 μm. The cathode collector may increase adhesiveness between the cathode active materials by forming a fine roughness on the surface of the current collector. As an example, various forms such as a film, a sheet, a foil, a net, a porous body, a foam body, a non-woven body, and the like may be used.

The anode may also be prepared by coating an anode current collector with an anode material including an anode active material. The anode material may also further include a conductive material and a binder in addition to the anode active material, as described above.

The anode active material may use a compound capable of reversible intercalation and deintercalation of lithium. Specific examples of the anode active material may include carbon materials such as artificial graphite, natural graphite, graphitized carbon fiber and amorphous carbon; metal compounds capable of alloying with lithium such as Si, Al, Sn, Pb, Zn, Bi, In, Mg, Ga, Cd, Si alloys, Sn alloys or Al alloys; metal oxides capable of doping and dedoping lithium such as $SiO_x$ (0<x<2), $SnO_2$, vanadium oxides and lithium vanadium oxides; or complexes including the metal compound and the carbon compound such as Si—C complexes or Sn—C complexes, and one or a mixture of two or more thereof may be used. In addition, a metal lithium thin film may be used as the anode active material. Further, a carbon material may use both low crystalline carbon and high crystalline carbon. The low crystalline carbon typically includes soft carbon and hard carbon, and the high crystalline carbon typically includes amorphous, platy, scaly, spherical or fiber-shaped natural graphite or artificial graphite, and high-temperature sintered carbon such as Kish graphite, pyrolytic carbon, mesophase pitch based carbon fiber, meso-carbon microbeads, mesophase pitches, and petroleum or coal tar pitch derived cokes.

However, the irreversible additive according to the present invention compensates for low anode efficiency such as the Si-based anode as described above, and may exhibit the most excellent effect in this case. Specifically, the anode active material may include a Si-based material represented by Formula (1).

$$SiO_x \qquad (1)$$

Here, 0<x<2.

In this case, the $SiO_x$-based anode active material may be included at 5 wt % or more based on a total weight of the anode active material.

The anode collector may be not particularly limited as long as it has high conductivity without causing chemical changes in a battery. Examples of the anode collector may include copper, stainless steel, aluminum, nickel, titanium, sintered carbon, or copper or stainless steel of which a surface is treated with carbon, nickel, titanium, silver, or the like, aluminum-cadmium alloys, and the like. In addition, the anode collector may normally have a thickness of 3 μm to 500 μm. The anode collector may increase adhesiveness between the anode active materials by forming a fine roughness on the surface of the current collector, similar to the cathode collector. As an example, various forms such as a film, a sheet, a foil, a net, a porous body, a foam body, a non-woven fabric body, and the like may be used.

The separator separates an anode and a cathode, and provides an ion channel for lithium ions, and is not particularly limited as long as it is commonly used as a separator in a lithium secondary battery. Particularly, a separator having low resistance against ion migration of an electrolyte and having excellent electrolyte moisture containing ability is preferable. Specifically, the separator may be made of a porous polymer film, for example, a porous polymer film prepared from a polyolefin-based polymer such as an ethylene homopolymer, a propylene homopolymer, an ethylene-butene copolymer, an ethylene-hexene copolymer or an ethylene-methacrylate copolymer or a laminate structure having two or more layers.

Alternatively, the separator may be made of a porous nonwoven fabric, for example, a nonwoven fabric made of high-melting point glass fiber, polyethylene terephthalate fiber, and the like. In addition, in order to ensure heat resistance or mechanical strength, the separator may be a coated separator including ceramic components or polymer materials, and selectively, may be used in a single-layer or multi-layer structure.

In addition, the electrolyte used in the present invention may be an organic liquid electrolyte, an inorganic liquid electrolyte, a solid polymer electrolyte, a gel polymer electrolyte, an inorganic solid electrolyte, a molten-type inorganic electrolyte or the like, which may be used in the manufacture of a lithium secondary battery, but the present invention is not limited thereto.

Specifically, the electrolyte may include an organic solvent and a lithium salt.

The organic solvent is not particularly limited as long as it may act as a medium capable of migrating ions involved in an electrochemical reaction of a battery. Specifically, the organic solvent may be an ester-based solvent such as methyl acetate, ethyl acetate, γ-butyrolactone, ε-caprolactone or the like; an ether-based solvent such as dibutyl ether, tetrahydrofuran or the like; a ketone-based solvent such as cyclohexanone or the like; an aromatic hydrocarbon-based solvent such as benzene, fluorobenzene or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC) or the like; an alcohol-based solvent such as ethyl alcohol, isopropyl alcohol or the like; nitriles such as R-CN (R is a linear, branched or cyclic hydrocarbon group of C2 to C20 and may include a double-bond aromatic ring and an ether bond) or the like; amides such as dimethylformamide or the like; dioxolanes such as 1,3-dioxolane or the like; or sulfolanes. Among these compounds, the carbonate-based solvent is preferable, and a mixture of a cyclic carbonate having high ionic conductivity and a high dielectric constant, which are capable of increasing the charging and discharging performance of a battery (for example, ethylene carbonate, propylene carbonate, or the like) and a linear carbonate-based compound with low viscosity (for example, ethyl methyl carbonate, dimethyl carbonate, diethyl carbonate, or the like) is more preferable. In this case, when the cyclic carbonate and chain carbonate are mixed at a volume ratio of about 1:1 to 9 for use, excellent performance of the electrolyte may be exhibited.

The lithium salt is not particularly limited as long as it is a compound which can provide lithium ions used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiI, $LiB(C_2O_4)_2$, or the like. The concentration of the lithium salt is preferably within a range of 0.1 M to 2.0 M. When the concentration of the lithium salt is within the above range, an electrolyte has appropriate conductivity and viscosity, and thus excellent performance of the electrolyte may be exhibited and lithium ions may be effectively migrated.

In addition to the electrolyte components, for the purpose of improving lifespan characteristics of the battery, suppressing a decrease in battery capacity, improving discharge capacity of the battery and the like, the electrolyte may further include one or more additives such as a haloalkylene carbonate-based compound such as difluoroethylene carbonate or the like, pyridine, triethyl phosphite, triethanolamine, a cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkyl ethers, ammonium salts, pyrrole, 2-methoxyethanol, aluminum trichloride and the like. In this case, the additives may be included at 0.1 wt % to 5 wt % based on a total weight of the electrolyte.

The secondary battery according to the present invention stably exhibit excellent discharging capacity, output property, and capacity retention, and therefore may be used as power source in portable devices such as a mobile phone, a laptop computer, a digital camera, and the like and the electric vehicles such as a hybrid electric vehicle (HEV), and the like.

MODE FOR INVENTION

Hereinafter, examples of the present invention will be described in detail in such a manner that it may easily be implemented by those skilled in the art to which the present invention pertains. However, the present invention may be implemented in various different forms and is not limited to the embodiment described herein.

Comparative Example 1

50 g of $Li_2O$, 136 g of NiO, and 5.5 g of $(NH_4)_2HPO_4$ as the raw material of the element M were mixed, heated in the $N_2$ atmosphere at 685° C. for 18 hours, and then the resultant reactant was cooled, and the irreversible additive particles were obtained.

Comparative Example 2

50 g of $Li_2O$, 136 g of NiO, and 5.5 g of $(NH_4)_2HPO_4$ as the raw material of the element M were mixed, heated in the $N_2$ atmosphere at 685° C. for 18 hours, heated at 685° C. for 18 hours once again, and then the resultant reactant was cooled, and the irreversible additive particles were obtained.

Example 1

50 g of $Li_2O$, 136 g of NiO, and 5.5 g of $(NH_4)_2HPO_4$ as the raw material of the element M were mixed and heated in the $N_2$ atmosphere at 685° C. for 18 hours. Then, 7.6 g of NiO (0.5 times the mole ratio of $Li_2O$ present in the obtained reactant) was additionally mixed to the obtained reactant and heated at 685° C. for 18 hours, and the resultant was cooled, and the irreversible additive particles were obtained.

Example 2

50 g of $Li_2O$, 136 g of NiO, and 5.5 g of $(NH_4)_2HPO_4$ as the raw material of the element M were mixed and heated in the $N_2$ atmosphere at 685° C. for 18 hours. Then, 2.6 g of NiO (0.17 times the mole ratio of $Li_2O$ present in the obtained reactant) was additionally mixed to the obtained reactant and heated at 685° C. for 18 hours, and the resultant was cooled, and the irreversible additive particles were obtained.

Experimental Example 1

Measurement of Content of Lithium By-Product by pH Titration

A content of the lithium by-product was measured by performing pH titration on the irreversible additive particles prepared in Examples 1 and 2 and Comparative Examples 1 and 2.

In detail, 10 g of each irreversible additive was added to 100 mL of distilled water, the mixtures were stirred for 5 minutes to melt the lithium by-product, and then the mixtures were titrated by acid-base titration using 0.1 M of HCl.

A value was calculated by converting the melted lithium by-product into wt % based on the total weight of the obtained irreversible additive.

The calculation is performed as below. The titration curve may be obtained by performing acid-base titration on the irreversible additives of the examples and the comparative examples. Such a curve has an inflection point. A content of $Li_2CO_3$ is calculated based on a value corresponding to two times (which is 2Y, this is because $Li_2CO_3$ needs a doubled amount of acid) the amount Y of acid corresponding to the right side of such an inflection and a content of LiOH is calculated based on a value corresponding to an amount of acid (X—Y) obtained by subtracting the amount Y of acid corresponding to the right side of the inflection from an amount X of acid corresponding to the left side of the inflection, and then the content of $Li_2CO_3$ and the content of LiOH are converted into wt % based on the total weight of the irreversible additive, respectively.

As a result of the analysis, it was confirmed that the content of LiOH was measured as 2.5 wt % or less and the content of $Li_2CO_3$ was also measured very low as 0.35 wt % or less, based on the total weight of the irreversible additive in the irreversible additives of Examples 1 and 2.

Meanwhile, in the case of Comparative Example 1 in which no secondary treatment with NiO was conducted, it was confirmed that the content of LiOH was 4 wt % or more and the content of $Li_2CO_3$ was 0.4 wt % or more.

The lithium by-product was also decreased slightly in Comparative Example 2, likely due to the secondary heat treatment, but even with this second heat treatment, the absence of any additional NiO added for this second heat treatment resulted in an insignificant decrease, specifically, the content of LiOH is 3 wt % or more, and the content of $Li_2CO_3$ is 0.3 wt % or more. Therefore, a desired decrease effect is still not obtained.

Experimental Example 2

XRD Analysis

A series of cathode slurries were prepared by mixing each of the irreversible additive prepared in Examples 1 and 2 and Comparative Examples 1 and 2 with a carbon black conductive material and a PVdF binder in a weight ratio of 92.5:3.5:4 in an N-methylpyrrolidone solvent. Each prepared cathode slurry was then coated on an aluminum current collector, and then the current collector was dried and rolled to prepare a cathode.

X-ray diffraction analysis (XRD) was performed on each prepared cathode using Cu—Kα X-ray, and an X-ray diffractometer (D4 Endeavor, manufactured by Bruker Corporation) was used for the XRD analysis. The analysis results are shown in Table 1.

As described above, the mole ratios of $Li_{2+a}Ni_{1-b}M_bO_{2+c}$ and NiO are calculated from the cathode before the charging.

The mole ratio is calculated as below. The conductive material and the binder are not under consideration because observed peaks thereof are too small when the XRD analysis of the cathode is performed. The mole ratios of the $Li_{2+a}Ni_{1-b}M_bO_{2+c}$ and the NiO are calculated by using values of intensity (the maximum point of a peak) and width (width of the middle of the peak) of the $Li_{2+a}Ni_{1-b}M_bO_{2+c}$ and the NiO, respectively, based on the Rietveld method.

As a result of the analysis, it was confirmed that the content of the $Li_{2+a}Ni_{1-b}M_bO_{2+c}$ was increased up to 93% or more based on the total of the $Li_{2+a}Ni_{1-b}M_bO_{2+c}$ and the NiO in the irreversible additive prepared by the method of the present invention (Examples 1 and 2). Meanwhile, in the case of Comparative Example 1, the content of the $Li_{2+a}Ni_{1-b}M_bO_{2+c}$ was below 90% based on the total of the $Li_{2+a}Ni_{1-b}M_bO_{2+c}$ and the NiO, and in the case of Comparative Example 2, while the content of the $Li_{2+a}Ni_{1-b}M_bO_{2+c}$ was increased slightly likely due to the secondary heat treatment, once again, the absence of a second NiO addition meant that the content did not reach 93% based on the total of the $Li_{2+a}Ni_{1-b}M_bO_{2+c}$ and the NiO.

Analysis of Content of $Li_2O$

The prepared cathodes as described above were prepared in the form of coin-cell and discharged up to 4.25 V with 0.1 C in a constant current (CC)/constant voltage (CV) mode, and then a peak density thereof was analyzed by the XRD analysis of the charged cathode to calculate the mole ratio of the $Li_2O$. The calculation results are shown in Table 1.

Here, the samples used in the XRD analysis are the cathode obtained by decomposing the cells after the charging, and were analyzed as below.

Since a structure of $Li_{2+a}Ni_{1-b}M_bO_{2+c}$ and a position of the peak of $Li_{2+a}Ni_{1-b}M_bO_{2+c}$ are changed due to the charge, the number of moles of $Li_2O$ is estimated based on the content of the NiO calculated by the Rietveld method by comparing the intensity of the peak of the NiO before the charging to the intensity of the peak of the $Li_2O$ after the charging.

The calculated mole number of the $Li_2O$ was converted based on 1 mole of the $Li_{2+a}Ni_{1-b}M_bO_{2+c}$+NiO calculated above.

For example, if the intensity of the peak of the NiO before the charging is 100 and a ratio of the NiO is 5 mol %, when the peak of the $Li_2O$ is 50, a ratio of the $Li_2O$ is estimated as 2.5 mol %.

It could be confirmed that the content of the $Li_2O$ according to the examples of the present invention is 0.09 mole or less, but the content of the $Li_2O$ according to the comparative examples exceeds 0.14 by comparing the calculated values.

Experimental Example 3

Viscosity Measurement

The irreversible additive prepared in Examples 1 and 2 and Comparative Examples 1 and 2, $LiNi_{0.8}Mn_{0.1}Co_{0.1}O_2$ as a cathode active material, a carbon black conductive material, and a PVdF binder were mixed in a weight ratio of 4.6:87.9:3.5:4 in an N-methylpyrrolidone solvent, and then a cathode slurry for each additive was prepared.

Figure 1:
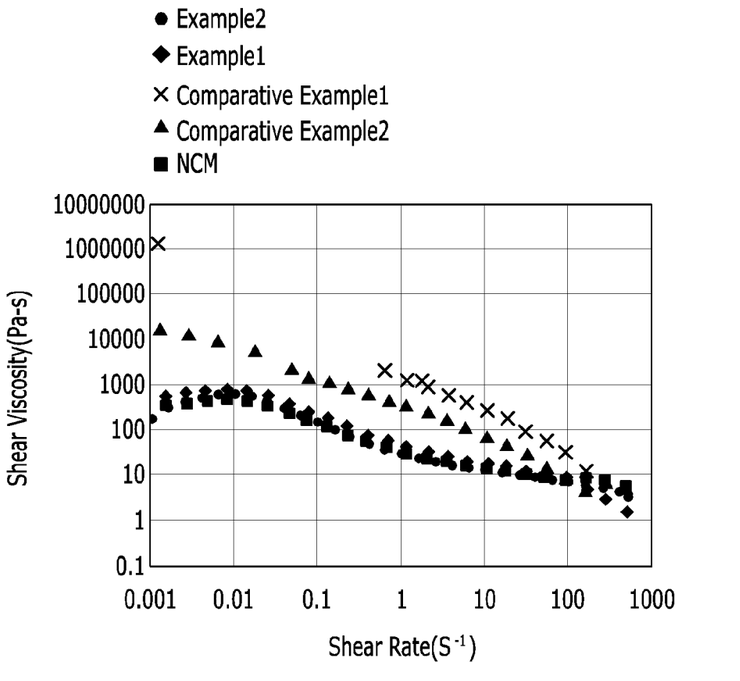
FIG. 1 is a graph showing results of viscosity measurement according to Experimental Example 3.

The DV2TLV viscometer (manufactured by Brookfield Engineering) was used for measuring viscosity of the cathode slurries, 300 ml of the slurries were prepared, and the viscosity of the slurries was measured by rotating blades of the viscometer at 1,200 rpm, and the measurement results are illustrated in FIG. 1. For reference, as a reference example, a slurry including no irreversible additive and including only 92.5 wt % of $LiNi_{0.8}Mn_{0.1}Co_{0.1}O_2$ used as the cathode active material was also measured.

As a result of the analysis, it could be confirmed that the cathode slurry including the irreversible additive of Examples 1 and 2 has a viscosity characteristic similar with the cathode slurry including only $LiNi_{0.8}Mn_{0.1}Co_{0.1}O_2$, meanwhile, the cathode slurry including the irreversible additive of Comparative Examples 1 and 2 has a relatively high viscosity. Therefore, it can be expected that in the case where a content of the lithium by-product is still high as 4 wt % or more as in Comparative Example 1 and 2, improvement effect of gelation of the composition is small.

Experimental Example 4

Manufacture of Lithium Secondary Battery

The lithium secondary battery was manufactured by a method described below using each of the irreversible additive prepared in Examples 1 and 2 and Comparative Examples 1 and 2.

In detail, the cathode slurries prepared in Experimental Example 3 were used.

In addition, a composition for forming an anode was prepared by mixing mesocarbon microbead (MCMB) having 10 wt % of SiO as an anode active material, a carbon black conductive material, and a PVdF binder in a weight ratio of 90:5:5 in an N-methylpyrrolidone solvent, and the composition was applied on a copper current collector to prepare a cathode.

An electrode assembly was prepared by placing a porous polyethylene separator between the cathode and the anode prepared as described above, the electrode assembly was placed inside a case, and then an electrolyte was injected into the case to manufacture a lithium secondary battery. Here, the electrolyte was prepared by dissolving 1.15 M concentration of lithium hexafluorophosphate ($LiPF_6$) in an organic solvent containing ethylene carbonate (EC)/dimethyl carbonate (DMC)/ethylmethyl carbonate (EMC) (mixing volume ratio of EC/DMC/EMC=3/4/3).

Measurement of Charge Capacity

The manufactured secondary battery was charged up to 4.3 V with 0.1 C in a CC/CV mode (until 0.005 C cut-off) and charged up to 2.5 V with 0.1 C in a CC mode to measure charge capacity, and the measurement results are shown in Table 1.

In the analyzing result, it could be confirmed that in the case where the cathode including the irreversible additive of Examples 1 and 2 is used, the charge capacity of the battery increases. That is because, in the case where the irreversible additive according to the present invention is used, a content of $Li_{2+a}Ni_{1-b}M_bM_bO_{2+c}$ is relatively increased so that Li is more sufficiently supplied to the SiO-based active material which has a low initial efficiency and exhibits a large amount of initial irreversible capacity loss during initial charge and discharge, and gelation is prevented due to a low amount of lithium by-product, which may exhibit a high capacity of the cathode active material.

TABLE 1

| | XRD analysis | | pH titration | | Mole of $Li_2O$ (based on 1 mole of $Li_{2+a}Ni_{1-b}M_bO_{2+c}$ + NiO) | One-time charge capacity (mAh/g) |
|---|---|---|---|---|---|---|
| | $Li_{2+a}Ni_{1-b}M_bO_{2+c}$ | NiO | LiOH (wt %) | $Li_2CO_3$ (wt %) | | |
| Example 1 | 96.1% | 3.9% | 1.25 | 0.30 | 0.054 | 406 |
| Example 2 | 94.2% | 5.8% | 2.2 | 0.33 | 0.087 | 402 |
| Comparative Example 1 | 88.7% | 11.3% | 4.177 | 0.458 | 0.157 | 385 |
| Comparative Example 2 | 92.7% | 7.3% | 3.803 | 0.351 | 0.142 | 394.2 |

INDUSTRIAL APPLICABILITY

In the method of preparing an irreversible additive according to the present invention, NiO is additionally added and heat-treated, such that a fraction of the lithium nickel-based oxide of the irreversible additive is increased and a content of a Li-based by-product such as unreacted lithium oxide is decreased, thereby reducing viscosity increase or gelation of the composition. Accordingly, the lithium secondary battery prepared using the cathode material including the irreversible additive exhibiting excellent electrochemical characteristics.

The invention claimed is:

1. A method of preparing an irreversible additive included in a cathode material for a lithium secondary battery, the method comprising:
    mixing a lithium precursor with NiO and heat-treating the mixture to prepare a lithium-excess transition metal oxide,
    wherein the lithium precursor comprises $Li_{2+a}Ni_{1-b}M_bO_{2+c}$, NiO, and $Li_2O$ physically bonded to each other at a mole ratio of x:y:z;
    wherein the lithium-excess transition metal oxide comprises $Li_{2+a}Ni_{1-b}M_bO_{2+c}$, NiO, and $Li_2O$ physically bonded to each other at a mole ratio of x':y':z',
    wherein, $-0.2 \leq a \leq 0.2$, $0 \leq b \leq 1$, and $0 \leq c \leq 0.2$, and $x \geq 0.8$, $x' \geq 0.93$, $0 < z \leq 0.21$, and $0 \leq z' \leq 0.09$, all of which based on $x < x'$, $y > y'$, and $z > z'$, and $x+y=1$ and $x'+y'=1$, and M is at least one element selected from the group consisting of Cu, Mg, Pt, Al, Co, P, and B.

2. The method of claim 1, wherein:
    $0.8 \leq x \leq 0.9$ and $0.93 \leq x' \leq 1.0$.

3. The method of claim 1, wherein:
    $0 \leq z' \leq 0.055$.

4. The method of claim 1, wherein:
    the NiO is mixed in an amount of 0.1 times to 1 times the mole ratio(z) of $Li_2O$ present in the lithium precursor per mole of the lithium precursor.

5. The method of claim 1, wherein:
    the heat treatment is performed in an inert atmosphere at 500 to 800° C. for 12 hours to 24 hours.

6. The method of claim 5, wherein:
    the inert atmosphere is a $N_2$ atmosphere or an Ar atmosphere.

7. The method of claim 5, wherein:
the heat treatment is performed at 650 to 700° C. for 12 hours to 24 hours.

8. A cathode material, comprising:
the irreversible additive prepared by the method of claim 1; and
a cathode active material,
wherein the irreversible additive includes the lithium-excess transition metal oxide in which $Li_{2+a}Ni_{1-b}M_bO_{2+c}$, NiO, and $Li_2O$ are physically bonded to each other at a mole ratio of x':y':z', $-0.2 \leq a \leq 0.2$, $0 \leq b < 1$, and $0 \leq c \leq 0.2$, x' is 0.93 or more, and z' is 0 to 0.09 based on x'+y'=1, and M is at least one element selected from the group consisting of Cu, Mg, Pt, Al, Co, P, and B.

9. A lithium secondary battery having a structure in which an electrode assembly is embedded in a battery case together with an electrolyte, wherein the electrode assembly includes:
a cathode having a cathode current collector on which the cathode material of claim 8 is coated;
an anode having an anode current collector on which an anode material including an anode active material is coated; and
a separator interposed between the cathode and the anode.

10. The lithium secondary battery of claim 9, wherein:
the anode active material includes a Si-based material represented by Formula (1), $$SiO_x \qquad (1)$$

here, $0<x<2$.

11. The method of claim 1, wherein:
the mixing step includes a heat treatment of the excess lithium precursor performed in an inert atmosphere at 650 to 700° C. for 12 hours to 24 hours.

* * * * *